United States Patent [19]
Ikeda

[11] Patent Number: 5,184,052
[45] Date of Patent: Feb. 2, 1993

[54] COOPERATIVE OPERATION SYSTEM FOR NUMBERICAL CONTROL APPARATUS

[75] Inventor: Yoshiaki Ikeda, Minamitsuru, Japan
[73] Assignee: Fanuc Ltd., Yamanashi, Japan
[21] Appl. No.: 668,515
[22] PCT Filed: Jul. 20, 1990
[86] PCT No.: PCT/JP90/00936
§ 371 Date: Mar. 25, 1991
§ 102(e) Date: Mar. 25, 1991
[87] PCT Pub. No.: WO91/03010
PCT Pub. Date: Mar. 7, 1991

[30] Foreign Application Priority Data
Aug. 18, 1989 [JP] Japan ................................ 1-212492

[51] Int. Cl.5 .............................................. G05B 19/18
[52] U.S. Cl. ..................................... 318/569; 318/600; 318/625; 318/568.2; 364/131; 364/474.11; 364/474.16
[58] Field of Search ............ 318/560, 561, 567, 568.1, 318/568.2, 569, 625, 562-564, 565; 364/131, 134, 474.22-474.25, 137-138, 474.11, 474.12, 474.16, 513, 221

[56] References Cited
U.S. PATENT DOCUMENTS

| | | | |
|---|---|---|---|
| 4,298,928 | 11/1981 | Etoh et al. ........................... | 364/200 |
| 4,888,726 | 12/1989 | Strugger et al. ................. | 364/900 X |
| 4,942,552 | 7/1990 | Merrill et al. .................... | 364/927.92 |
| 4,963,803 | 10/1990 | Kokura ................................ | 318/569 |
| 4,972,367 | 11/1990 | Burke .................................. | 364/921 |
| 5,032,975 | 7/1991 | Yamamoto et al. ............... | 364/134 |

FOREIGN PATENT DOCUMENTS
0348520 6/1929 European Pat. Off. .

Primary Examiner—William M. Shoop, Jr.
Assistant Examiner—David Martin
Attorney, Agent, or Firm—Staas & Halsey

[57] ABSTRACT

Disclosed is a cooperative operation system for a numerical control apparatus composed of numerical control apparatuses (CNCs) used in a transfer line. Each of CNCs (10, 20) is provided with a CNC control unit (11, 21), a switching circuit (12, 22) connected to the CNC control unit (11, 21) for switching an I/O signal, a RAM (13, 23) connected to the switching circuit (12, 22) for storing the I/O signal, a programmable machine controller (PMC) (16, 26) connected to the RAM (13, 23), and a serial transfer control circuit (15, 25) connected to the RAM (13, 23) for transferring the I/O signal to the another CNC. The PMC (16) receives or transmits the I/O signal of another CNC (20) through the serial transfer control circuit (15). The CNC (10, 20) can input and output the I/O signal thereof through the transfer control circuit (15, 25) to thereby increase the signal transfer speed, and thus a cooperative operation can be carried out at a high speed. Further, since the PMC (16) can directly receive the I/O signal of the another CNC (20) through the serial transfer control circuits (15, 25), a complex control can be carried out.

5 Claims, 2 Drawing Sheets

COOPERATIVE OPERATION SYSTEM FOR NUMBERICAL CONTROL APPARATUS

TECHNICAL FIELD

The present invention relates to a cooperative operation system for a numerical control apparatus composed of a plurality of numerical control apparatuses (CNCs), and more specifically, to a cooperative operation system for a CNC having a serial transfer control circuit through which I/O signals of other CNCs can be input and output.

BACKGROUND ART

Numerical control apparatuses (CNCs) for controlling stations by servo motors, which conventionally are pneumatically or hydraulically controlled, are now widely used to control a transfer line, and although these CNCs are known as a one axis CNC and control each station independently, a cooperative operation is needed thereamong.

For example, when a drilling operation is carried out at a first station and a tapping operation is carried out at a second station, the second station cannot carry out the tapping operation until the machining at the first station has been completed and the workpiece has been transferred to the second station.

An example of the working of this cooperative operation will be explained with reference to FIG. 2, which shows an example of a conventional cooperative operation system for CNCs. As shown in the figure, a one axis CNC 30 is composed of a CNC control unit 31, a RAM 33 in which an I/O signal is stored, a programmable machine controller (PMC) 36 for controlling the I/O signal, and an I/O circuit 37 having a driver and a receiver.

The one axis CNC 40 also shown in FIG. 2 has the same arrangement as that of the one axis CNC 30. A transfer line is actually composed of a plurality of these one axis CNCs, but a case in which only two one axis CNCs are used will be described here for simplicity.

A cooperative operation between these one axis CNCs 30 and 40 is carried out between the built-in PMCs 36 and 46 through the I/O circuits 37 and 47. An example of this is a case in which a machining completion signal of the one axis CNC 30 is transferred to the one axis CNC 40.

The receiver of the I/O circuit has a slow signal transfer speed, taking into consideration a noise margin and contact chatter and the like, because the receiver receives signals from limit switches and the like. Further, the driver also has a slow signal transfer speed, because the driver is designed by taking into consideration a required drive power and the like.

Therefore, an undue time is needed to transfer the machining completion signal from the one axis CNC 30 to the one axis CNC 40, and an answer back signal thereof from the one axis CNC 40 to the one axis CNC 30. Also, since the answer back signal is generated by the PMC 46 and confirmed by the PMC 36, the sequence program of each of the PMCs 36 and 46 is complex.

The above refers only to the case in which the machining completion signal is transferred from the one axis CNC 30, but many signals must be transferred and received when one table is controlled by the one axis CNCs 30 and 40, and thus the conventional system sometimes cannot carry out the required processes within a predetermined time.

DISCLOSURE OF THE INVENTION

Taking the above into consideration, an object of the present invention is to provide a cooperative operation system for a CNC by which a cooperative operation can be carried out simply and at a high speed.

To solve the above problem, according to the present invention, there is provided a cooperative operation system for a numerical control apparatus composed of a plurality of numerical control apparatuses (CNCs), wherein each of the CNCs comprises a CNC control unit, a switching circuit connected to the CNC control unit for switching an I/O signal used in the CNC control unit, a RAM connected to the switching circuit for storing the I/O signal, a programmable machine controller (PMC) connected to the RAM, an I/O circuit connected to the PMC, and a serial transfer control circuit connected to the I/O circuit and the RAM for transferring the I/O signal to another CNC, wherein the PMC receives or transmits an I/O signal of the another CNC through the serial transfer control circuit.

The CNCs can input and output the I/O signals thereof through the serial transfer control circuit, and therefore, the signal transfer speed is increased, and thus the cooperative operation can be carried out at a high speed.

Further, since the I/O signal of the other PMC can be directly input to or output from the PMC through the serial transfer control circuit, a complex control can be carried out.

BEST MODE OF CARRYING OUT THE INVENTION

An embodiment of the present invention will be described below with reference to the drawings.

Figure 1:
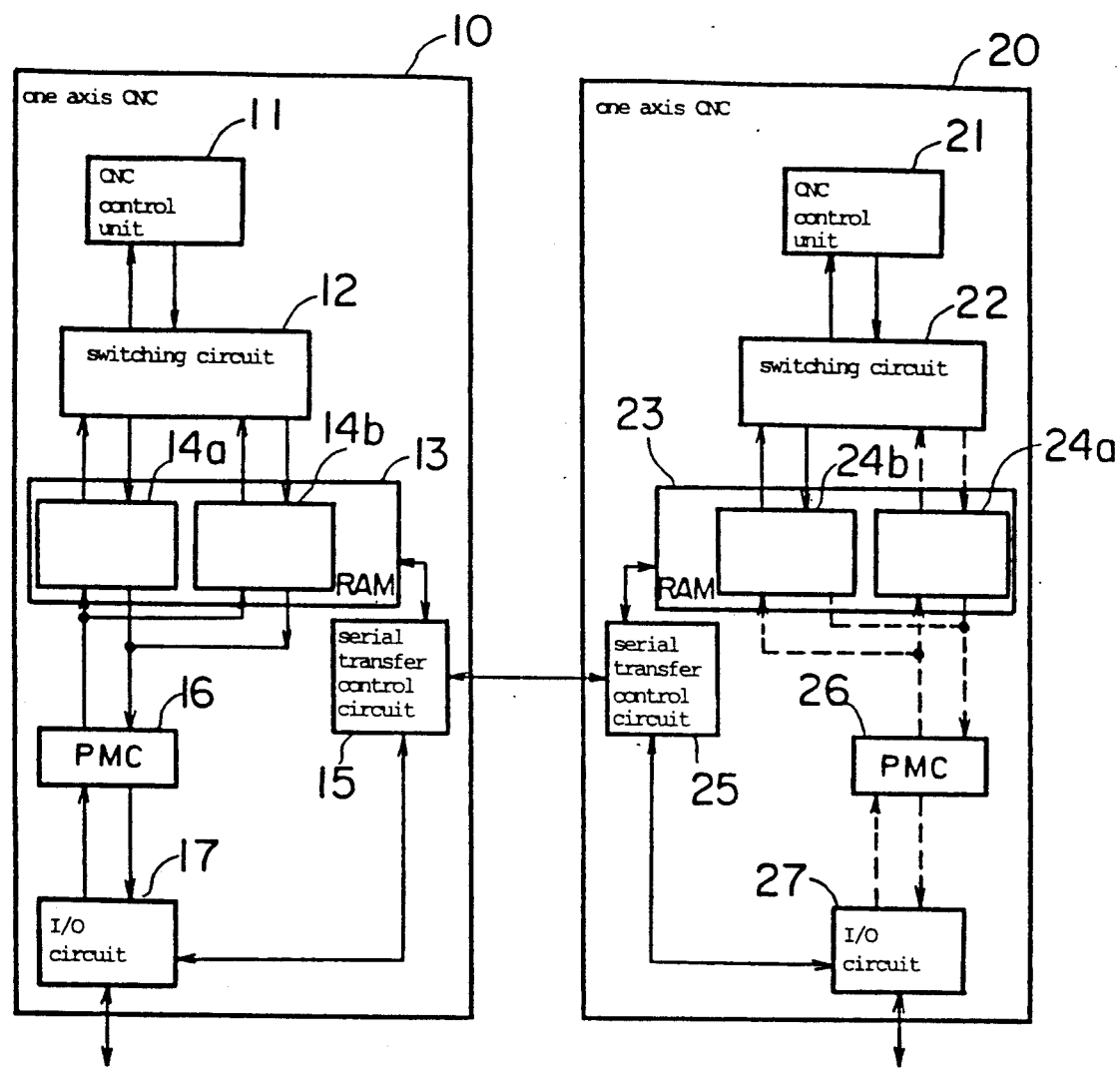
FIG. 1 is a diagram of an arrangement of a cooperative operation system for a CNC as a whole, according to the present invention.
Figure 2:
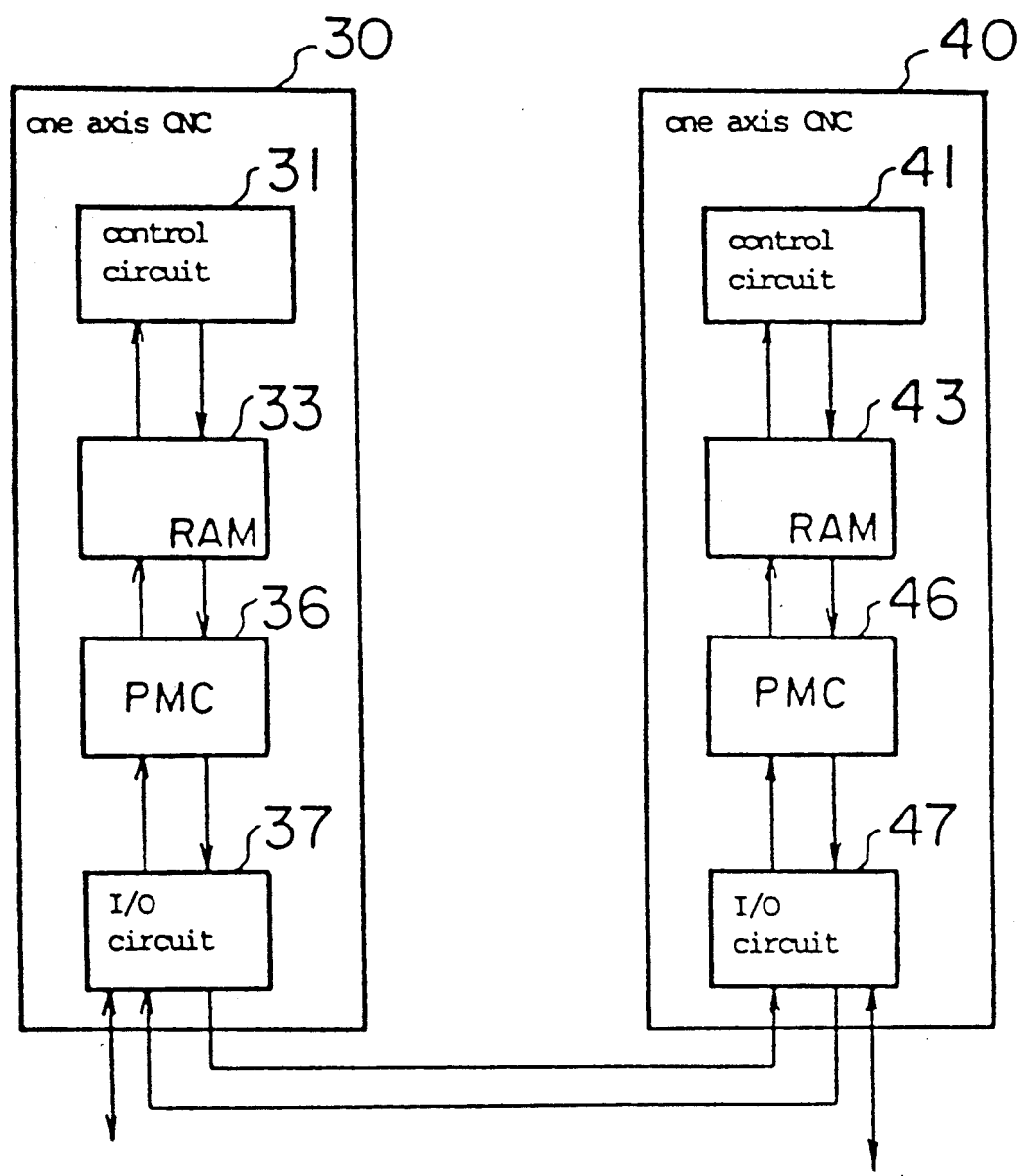
FIG. 2 is a diagram showing an example of a conventional cooperative operation system for a CNC.

FIG. 1 is a diagram of an arrangement of a cooperative operation system for a CNC as a whole, according to the present invention. FIG. 1 shows a one axis CNC 10 and a one axis CNC 20, for controlling a transfer line. The number of one axis CNCs actually corresponds to the number of stations of the transfer line connected to each other, but the case in which only two one axis CNCs are used will be described, for simplicity.

The CNCs for controlling the respective stations of the transfer line must operate cooperatively with each other to carry out the processes thereof, and an example of the working of this cooperative operation will be shown.

The one axis CNC 10 is mainly composed of a CNC control unit 11, which is composed of a microprocessor, ROM, RAM and the like. A switching circuit 12 is connected to the CNC control unit 11 to switch an I/O signal to be used, and further, a RAM 13 is connected to the switching circuit 12, and the switching circuit 12 switches an I/O signal 14a or 14b of the RAM 13 and transfers same to the CNC control unit 11.

A programmable machine controller (PMC) 16 is connected to the RAM 13, receives an external input signal, and process the input signal in accordance with a built-in sequence program. Further, the PMC receives a command signal from the CNC control unit 11 and supplies an output signal to the outside through an I/O circuit 17.

A serial transfer control circuit 15 is connected to the RAM 13, which is connected to the serial transfer control circuit 25 of a one axis CNC 20.

The one axis CNC 20 has the same arrangement as that of the one axis CNC 10 and thus a detailed description thereof is omitted.

Next, the cooperative operation between the CNCs will be described. Since in this example the one axis CNC 10 and the one axis CNC 20 control one table, one PMC can control an I/O signal to a machine side and thus the PMC 16 is used and the PMC 26 is not used. Accordingly, the wiring between the PMC 26 and elements connected thereto is shown by dotted lines.

Note, the servo motors (not shown) connected to the one axis CNC 10 are controlled by the CNC control unit 11 and the servo motors connected to the one axis CNC 20 are controlled by a CNC control unit 21.

Accordingly, an I/O signal of the one axis CNC 20 is read by the PMC 16 from an I/O circuit 27, through the serial transfer control circuit 25, the serial transfer control circuit 15 and the region 14b of the RAM 13, a required processing of the I/O signal is carried out, and a signal needed by the CNC control circuit 21 is supplied thereto through the region 14b of the RAM 13, the serial transfer control circuit 15, the serial transfer control circuit 25, the region 24b of a RAM 23, and a switching circuit 22.

Conversely, an output signal from the CNC control unit 21 is supplied to the PMC 16 through the switching circuit 22, the region 24b of the RAM 23, the serial transfer control circuit 25, the serial transfer control circuit 15 and the region 14b of the RAM 13, and then to a machine side control circuit through the I/O circuit 27 in a direction opposite to that of the input signal, after a necessary processing of the output signal has been carried out by the PMC 16.

An input signal of the one axis CNC 10 is supplied from the I/O circuit 17 to the PMC 16 and stored in the region 14a of the RAM 13 as usual, and in this case, the switching circuit 12 selects the input signal stored in the region 14a. Conversely, an output signal is supplied to the PMC 16 from the CNC control unit 11 through the switching circuit 12 and the region 14a, and then output from the I/O circuit 17 after a necessary processing thereof has been carried out.

Conversely, when the I/O signal of the one axis CNC 10 is processed by the PMC 26, the switching circuit 12 selects the region 14b as the region of the I/O signal.

As described above, the switching circuit 12 switches the use of the I/O signal from the PMC 16 and the use of the I/O signal from the other PMC 26. More specifically, a plurality of regions for the I/O signals are contained in the region of the RAM 13 and are switched by the switching circuit 12.

As shown by the above example, the one axis CNC 10 and the one axis CNC 20 control the one table, but of course, when the respective stations of a usual transfer line are to be independently controlled, the respective PMCs 16 and 26 are operated. Nevertheless, when the one axis CNC 10 needs the I/O signal of the one axis CNC 20, the one axis CNC 10 can obtain the I/O signal through the serial transfer control circuit 25, the serial transfer control circuit 15 and the region 14b of the RAM 13, and supply a necessary output signal by using the serial transfer control circuits 15 and 25.

Although the cooperative operation between the two one axis CNCs is explained in the above description, this description is also applicable to a similar cooperative operation between three or more one axis CNCs. Further, the description is applicable to a usual CNC containing a PMC in addition to the one axis CNC.

As described above, according to the present invention, since the serial transfer control circuits are provided to cause the I/O signal of other CNCs to be input or output by switching, a cooperative operation between the CNCs can be easily carried out at a high speed.

I claim:

1. A cooperative operation system for a plurality of numerical control apparatuses (CNCs), wherein each of said CNCs comprises:
   a CNC control unit:
   a switching circuit connected to said CNC control unit for switching an I/O signal used in said CNC control unit;
   a RAM connected to said switching circuit for storing said I/O signal;
   a programmable machine controller (PMC) connected to said RAM;
   an I/O circuit connected to said PMC; and
   a serial transfer control circuit connected to said I/O circuit and said RAM for transferring the I/O signal to another CNC, wherein said PMC receives or transmits an I/O signal of said another CNC through said serial transfer control circuit.

2. A cooperative operation system according to claim 1, wherein said PMC receives the I/O signal of said another CNC through said serial transfer control circuit and transfers same to said another CNC.

3. A cooperative operation system according to claim 1, wherein said RAM is divided into a plurality of regions for storing the I/O signal from said PMC and the I/O signal from said another CNC.

4. A cooperative operation system according to claim 1, wherein said CNC is a one axis CNC.

5. A cooperative operation system according to claim 1, wherein said CNC and said another CNC control one table.

* * * * *